US010832456B1

(12) United States Patent
Levy

(10) Patent No.: US 10,832,456 B1
(45) Date of Patent: Nov. 10, 2020

(54) SYSTEM AND METHOD FOR EXPERIENCING HIGHER DIMENSIONALITY DATA USING LOWER DIMENSIONALITY MEDIA

(71) Applicant: Robert B. Levy, Natick, MA (US)

(72) Inventor: Robert B. Levy, Natick, MA (US)

( * ) Notice: Subject to any disclaimer, the term of this patent is extended or adjusted under 35 U.S.C. 154(b) by 0 days.

(21) Appl. No.: 15/409,455

(22) Filed: Jan. 18, 2017

Related U.S. Application Data

(60) Provisional application No. 62/280,585, filed on Jan. 19, 2016.

(51) Int. Cl.
G06T 11/20 (2006.01)
G06T 19/20 (2011.01)

(52) U.S. Cl.
CPC ........... G06T 11/206 (2013.01); G06T 19/20 (2013.01); *G06T 2219/2021* (2013.01)

(58) Field of Classification Search
CPC .................. G06T 11/206; G06T 19/20; G06T 2219/2021
See application file for complete search history.

(56) References Cited

U.S. PATENT DOCUMENTS

| 8,866,818 | B2 * | 10/2014 | Rubin | G06T 11/206 345/440 |
| 9,269,172 | B2 * | 2/2016 | Cook | G06T 11/206 |
| 9,465,891 | B1 | 10/2016 | Kagan | |
| 2006/0044307 | A1 * | 3/2006 | Song | G06Q 10/06 345/419 |
| 2014/0247268 | A1 * | 9/2014 | Drucker | G06T 11/206 345/440.2 |
| 2016/0026418 | A1 * | 1/2016 | Bastaldo-Tsampalis | G06F 3/1206 358/1.15 |
| 2016/0321378 | A1 | 11/2016 | Kagan | |
| 2017/0017730 | A1 | 1/2017 | Kagan | |

FOREIGN PATENT DOCUMENTS

| WO | 2014130044 A1 | 8/2014 |
| WO | 2016176511 A1 | 11/2016 |

OTHER PUBLICATIONS

Donalek et al, Oct. 2014. Immersive and collaborative data visualization using virtual reality platforms. In Big Data (Big Data), 2014 IEEE International Conference on (pp. 609-614). IEEE.*
Roston et al ("What's Really Warming the World", 2015, https://www.bloomberg.com/graphics/2015-whats-warming-the-world/) Year: 2015).*
Caillette ("An Interactive Particle System", 2002, University of Manchester) (Year: 2002).*
Kaper, Hans G., Elizabeth Wiebel, and Sever Tipei. "Data sonification and sound visualization.", Computing in science & engineering 1.4 (1999): 48-58. (Year: 1999).*

(Continued)

*Primary Examiner* — Xin Sheng
(74) *Attorney, Agent, or Firm* — Loginov & Associates, PLLC; William A. Loginov

(57) ABSTRACT

A computer-implemented system and method for interactively displaying static or real-time streaming multivariate data onto a 2D computer display, via virtual reality, mixed reality, augmented reality or holographic display hardware, or manufactured using hardware such as a 3D printer.

18 Claims, 15 Drawing Sheets

(56) References Cited

OTHER PUBLICATIONS

Lagarde ("Water drop 2a—Dynamic rain and its effects", 2012, https://seblagarde.wordpress.com/2012/12/27/water-drop-2a-dynamic-rain-and-its-effects/) (Year: 2012).*

Becker et al ("Visulaizing Network Data", 1995, IEEE) (Year: 1995).*

Devaux et al., "DataTube4log: a Visual Tool for Mining Multi-Threaded Software logs", 2014 18th International Conference on Information Visualisation, 2014.

Yuhua, Guo, "Implementation of 3D Kiviat Diagrams", Vaxjo University School of Mathematics and System Engineering, Reports from MSI, Oct. 2008.

Fanea et al, "An Interactive 3D Integration of Parallel Coordinates and Star Glyphs", IEEE Symposium on Information Visualization 2005, Oct. 2005.

Ankerst, Mihael. "Visual data mining with pixel-oriented visualization techniques." Proceedings of the ACM SIGKDD Workshop on Visual Data Mining. 2001.

Noirhomme-Fraiture, Monique. "Visualization of large data sets: the zoom star solution." International Electronic Journal of Symbolic Data Analysis (2002): 26-39.

Bouali, Fatma, Sebastien Devaux, and Gilles Venturini. "Visual mining of time series using a tubular visualization." The visual computer 32.1 (Jan. 2016): 15-30.

\* cited by examiner 8.1: Circumplex 8.4: Oval 8.2: Radial Histogram 8.5: N-sided Shape 8.3: Pie Chart 8.6: Photo or Image 9.1: Geo Bars 9.4: Ellipsoid 9.2: 3D Fractal 9.5: Polyhedra 9.3: Molecule

SYSTEM AND METHOD FOR EXPERIENCING HIGHER DIMENSIONALITY DATA USING LOWER DIMENSIONALITY MEDIA

RELATED APPLICATIONS

This application claims the benefit of U.S. Provisional Application Ser. No. 62/280,585, filed Jan. 19, 2016, entitled SYSTEM AND METHOD FOR EXPERIENCING HIGHER DIMENSIONALITY DATA USING LOWER DIMENSIONALITY MEDIA, the entire disclosure of which is herein incorporated by reference.

FIELD OF THE INVENTION

The present application relates to experiencing higher dimensionality data using lower dimensionality media.

BACKGROUND OF THE INVENTION

Human brains evolved over millions of years for processing spatial inputs all around us. The visual cortex is nearly a third of the cortical mass yet while looking at a two-dimensional flat screen, research shows very little of the visual cortex is being utilized by the viewer. Since invention of conventional 2D graphs such as bar, line, scatter and even 3D surface plots, data visualization systems and methods have enabled people to intuitively understand relationships within some of their data. However, there are inherent limitations and thus inherent technological problems when a user desires to view a data set having more dimensions or variables than is capable of being displayed by the lower dimension media, such as 2D graph or 3D surface plots. In view of these inherent limitations, such higher-dimension datasets cannot be viewed with full appreciation for all dimensions or variables. In this regard, the prior art fails to effectively help the user intuitively experience more than a few dimensions or variables of data per plot or visualization.

SUMMARY OF THE INVENTION

The present disclosure provides a technological solution to the technological problem described above of attempting to experience higher dimensionality data using lower dimensionality media, allowing a user to for intuitively apply his or her experience, creativity and human wisdom to seek meaning and relationships amid complexity that is otherwise orders of magnitude out of reach. Embodiments use visual, auditory, and/or other sensory input as features of experience to represent data dimensions such that the human mind can more readily comprehend higher dimensionality than is possible using conventional data graphing, plotting and visualization techniques.

The present disclosure provides a system and method that is necessarily rooted in computer technology and provides a technological solution to the above-mentioned technological problems. Specifically, the present application endeavors to improve the computer's operation and functionality by improving the ability to display information and interact with the human operator, and to do so interactivity and in a manner not possible by a human analog (i.e. by hand or by merely thinking).

One aspect of the disclosure provides a computer-implemented method for interactively displaying static or real-time streaming multivariate data onto a 2D computer display, or via virtual reality, mixed reality, augmented reality, 3D glasses or holographic display hardware, or manufactured using hardware such as a 3D printer, the method comprising: generating a 2D shape or 3D object (including 3D extrusion of said 2D shape) to represent each multivariate data record, wherein one or more features of said 2D shape or 3D object together represent the plurality of data variables of said multivariate data record or optionally, a subset thereof; rendering a plurality of said generated 2D shapes or 3D objects, optionally in sequence along a 3D spline or 3D line, optionally connected visually in said 3D space; optionally for real-time streaming, iterating, responding to an event trigger or similar means whereby current and/or new instances of said 2D shapes or 3D objects are modified, generated and/or visually appended to said plurality of 2D shapes or 3D objects in said 3D space.

In one example, said features may optionally include one or more of shape, diameter, length, width, depth, thickness, cross-section shape, color, position, number of edges, movement over time and/or trails denoting said movement, distance from adjoining 2D shape(s) or 3D object(s) in 3D space, texture and/or bumpiness thereof, spatial audio and/or properties thereof, translucence, lighting properties such as shadows and/or reflectivity, color, illumination emanating from within, rotational angle, glowing effect about and/or color thereof, metallicity, surface smoothness, movement such as oscillation and speed thereof, special effects, particle effects such as sparks or fire, clouds, animated effects such as weather, orbits, two dimensions of angle along an optional polygon mesh, line or spline which may optionally connect this with adjoining 2D shape(s) or 3D object(s), and/or other features of said 2D shape or 3D object or its connection with adjoining 2D shape(s) or 3D object(s) in 3D space In one example, said 2D shapes or 3D objects may optionally be interconnected in a sequential or network configuration in 3D space. Said interconnection may itself optionally be rendered using a plurality of said features for representing multiple data variables about said interconnection. Alternatively, said 2D shapes or 3D objects might not be connected at all, in which case the functionality becomes a multidimensional improvement upon the conventional scatterplot.

In one example, said multidimensional data to be visualized is received from another computer program or across a network from one or more computing device(s), optionally, sending event, invoking callback or other such means to affect said other computer program or computing device(s) based on gestural interaction or other user inputs for purpose of said host system altering data streamed, iterated or otherwise transmitted into the multi-dimensional data visualizer.

Another aspect of the disclosure provides a computer-implemented method for interactively displaying static or real-time streaming multivariate datasets onto a 2D computer display or manufactured using a computer printer or other printing device, the method comprising: generating a 2D shape to represent each multivariate data record, wherein one or more features of said 2D shape together represent the plurality of data variables of said multivariate data record or optionally, a subset thereof; rendering a plurality of said generated 2D shapes, optionally in sequence along a 2D spline or 2D line, optionally connected visually; optionally for real-time streaming, iterating, responding to an event trigger or similar means whereby current and/or new instances of said 2D shapes are modified, generated and/or visually appended to said plurality of 2D shapes updating the 2D visualization.

In one example, said features may optionally include one or more of shape, diameter, height, width, thickness, color, fill pattern or texture and/or bumpiness thereof, spatial audio and/or properties thereof, illumination emanating from within, position, number of edges, movement over time and/or trails denoting said movement, movement over time, distance from the next 2D shape, translucence, lighting properties such as shadows and/or reflectivity, color, glowing effect about and/or color thereof, metallicity, surface smoothness, movement such as oscillation and speed thereof, particle effects such as sparks or fire, clouds, animated effects such as weather, orbits, angle along optional line(s), spline(s) or polygon(s) which may optionally connect this with adjoining shape(s), and/or other features of said 2D shape or its connection with adjoining 2D shape(s).

In one example, said 2D shapes may optionally be interconnected in a sequential or network configuration. Said interconnection may itself optionally be rendered using a plurality of said features for representing multiple data variables about said interconnection. Alternatively, said 2D shapes might not be connected at all, in which case the functionality becomes a multidimensional improvement upon the conventional scatterplot.

In one example, said multidimensional data to be visualized is received from another computer program or across a network from one or more computing device(s), optionally, sending event, invoking callback or other such means to affect said other computer program or computing device(s) based on gestural interaction or other user inputs for purpose of said host system altering data streamed, iterated or otherwise transmitted into the multi-dimensional data visualizer.

Another aspect of the disclosure provides a non-transitory computer readable medium with computer executable instructions stored thereon executed by one or more processor(s) to perform the method interactively displaying static or real-time streaming multivariate data onto a 2D computer display, or via virtual reality, mixed reality, augmented reality, 3D glasses or holographic display hardware, or manufactured using hardware such as a 3D printer, the method comprising: generating a 2D shape or 3D object (including 3D extrusion of said 2D shape) to represent each multivariate data record, wherein one or more features of said 2D shape or 3D object together represent the plurality of data variables of said multivariate data record or optionally, a subset thereof; rendering a plurality of said generated 2D shapes or 3D objects, optionally in sequence along a 3D spline or 3D line, optionally connected visually in said 3D space; optionally for real-time streaming, iterating, responding to an event trigger or similar means whereby current and/or new instances of said 2D shapes or 3D objects are modified, generated and/or visually appended to said plurality of 2D shapes or 3D objects in said 3D space.

In one example, said features may optionally include one or more of shape, diameter, length, width, depth, thickness, cross-section shape, color, position, number of edges, movement over time and/or trails denoting said movement, distance from adjoining 2D shape(s) or 3D object(s) in 3D space, texture and/or bumpiness thereof, spatial audio and/or properties thereof, translucence, lighting properties such as shadows and/or reflectivity, color, illumination emanating from within, rotational angle, glowing effect about and/or color thereof, metallicity, surface smoothness, movement such as oscillation and speed thereof, particle effects such as sparks or fire, clouds, animated effects such as weather, orbits, two dimensions of angle along an optional polygon mesh, line or spline which may optionally connect this with adjoining 2D shape(s) or 3D object(s), and/or other features of said 2D shape or 3D object or its connection with adjoining 2D shape(s) or 3D object(s) in 3D space.

In one example, said 2D shapes or 3D objects may optionally be interconnected in a sequential or network configuration in 3D space. Said interconnection may itself optionally be rendered using a plurality of said features for representing multiple data variables about said interconnection. Alternatively, said 2D shapes or 3D objects might not be connected at all, in which case the functionality becomes a multidimensional improvement upon the conventional scatterplot.

In one example, said multidimensional data to be visualized is received from another computer program or across a network from one or more computing device(s), optionally, sending event, invoking callback or other such means to affect said other computer program or computing device(s) based on gestural interaction or other user inputs for purpose of said host system altering data streamed, iterated or otherwise transmitted into the multi-dimensional data visualizer.

Another aspect of the disclosure provides a non-transitory computer readable medium with computer executable instructions stored thereon executed by one or more processor(s) to perform the method interactively displaying static or real-time streaming multivariate datasets onto a 2D computer display or manufactured using a computer printer or other printing device, the method comprising: generating a 2D shape to represent each multivariate data record, wherein one or more features of said 2D shape together represent the plurality of data variables of said multivariate data record or optionally, a subset thereof; rendering a plurality of said generated 2D shapes, optionally in sequence along a 2D spline or 2D line, optionally connected visually; optionally for real-time streaming, iterating, responding to an event trigger or similar means whereby current and/or new instances of said 2D shapes are modified, generated and/or visually appended to said plurality of 2D shapes updating the 2D visualization.

In one example, said features may optionally include one or more of shape, diameter, height, width, thickness, color, fill pattern or texture and/or bumpiness thereof, spatial audio and/or properties thereof, illumination emanating from within, position, number of edges, movement over time and/or trails denoting said movement, distance from the next 2D shape, translucence, lighting properties such as shadows and/or reflectivity, color, glowing effect about and/or color thereof, metallicity, surface smoothness, movement such as oscillation and speed thereof, particle effects such as sparks or fire, clouds, animated effects such as weather, orbits, angle along optional line(s), spline(s) or polygon(s) which may optionally connect this with adjoining shape(s), and/or other features of said 2D shape or its connection with adjoining 2D shape(s).

In one example, said 2D shapes may optionally be interconnected in a sequential or network configuration. Said interconnection may itself optionally be rendered using a plurality of said features for representing multiple data variables about said interconnection. Alternatively, said 2D shapes might not be connected at all, in which case the functionality becomes a multidimensional improvement upon the conventional scatterplot.

In one example, said multidimensional data to be visualized is received from another computer program or across a network from one or more computing device(s), optionally, sending event, invoking callback or other such means to affect said other computer program or computing device(s)

based on gestural interaction or other user inputs for purpose of said host system altering data streamed, iterated or otherwise transmitted into the multi-dimensional data visualizer.

BRIEF DESCRIPTION OF THE DRAWINGS

The invention description below refers to the accompanying drawings, of which.

DETAILED DESCRIPTION

Figure 1:
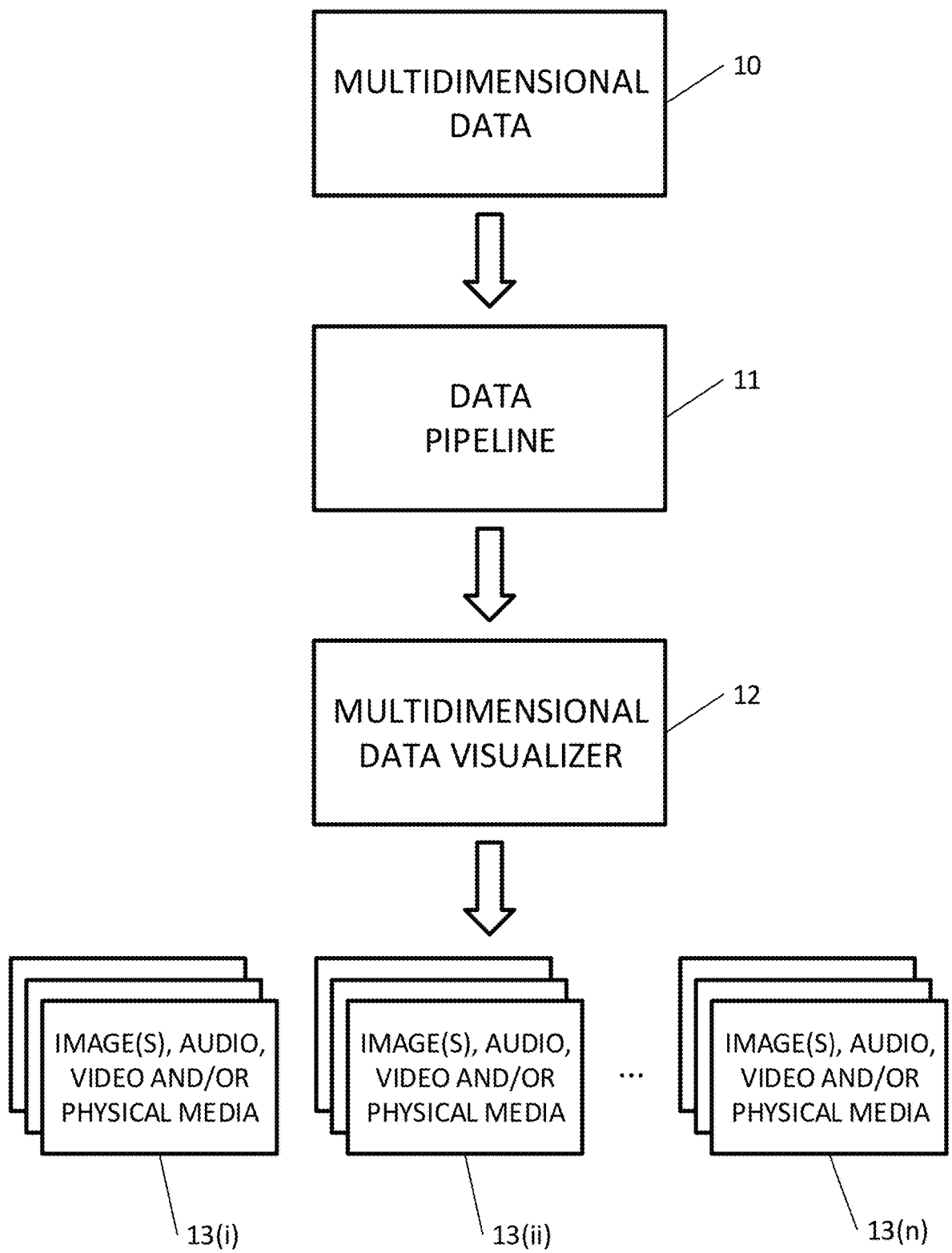
FIG. 1 is a flow diagram illustrating one embodiment for visualizing higher dimensionality data using lower dimensionality media.

FIG. 1 is a block diagram illustrating an example where multidimensional (i.e. multivariate) data 10 is passed via a data pipeline 11 into one or more multidimensional data visualizer(s) 12 (examples of which are described below) which generates one or more experiences of the data 13, for example in the form of image(s), audio, video, and/or physical media 13(*i*) to 13(*n*), where n can be any integer.

Figure 2:
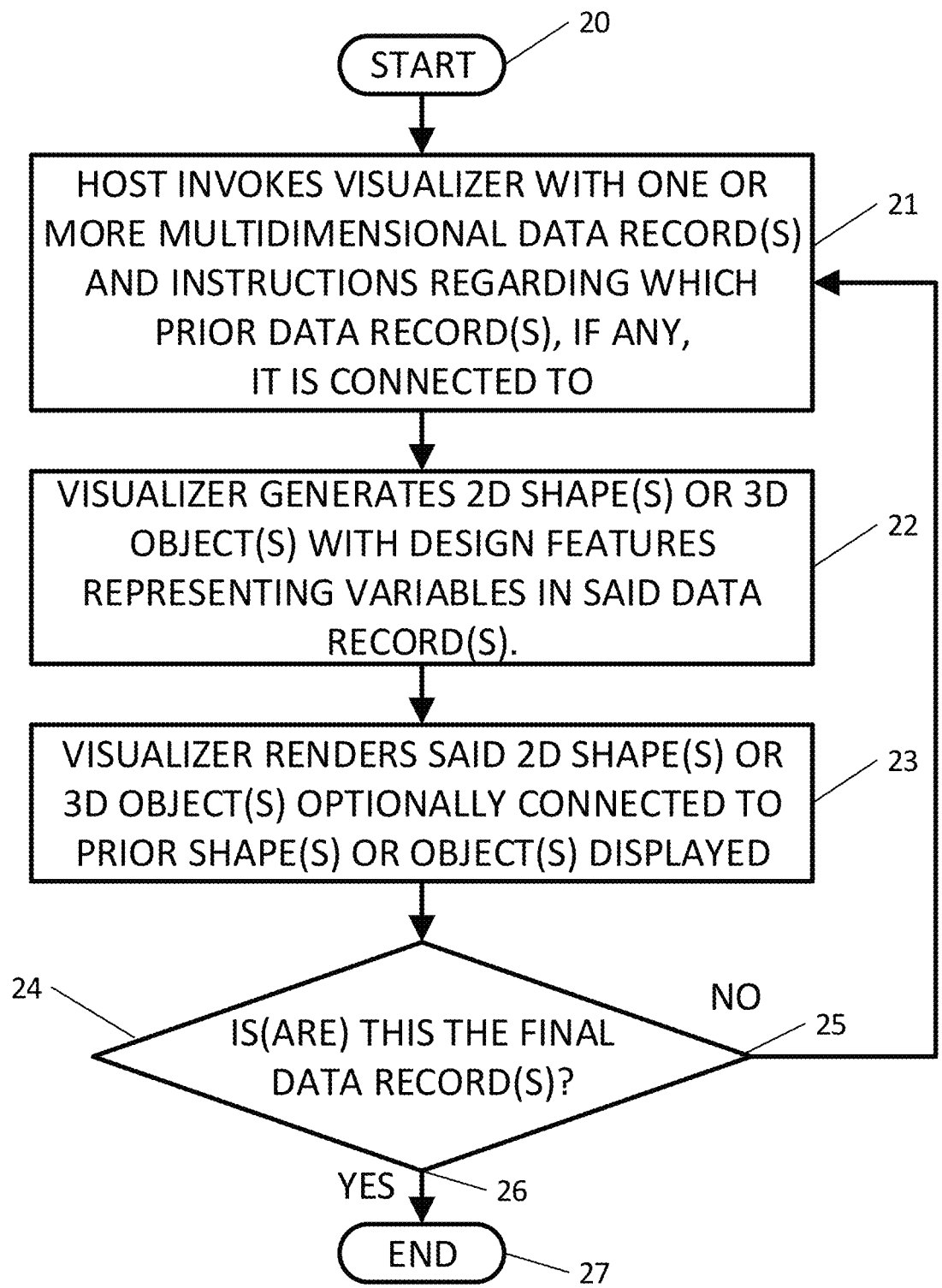
FIG. 2 is a schematic flow diagram illustrating one embodiment capable of streaming data from a host to a visualizer.

FIG. 2 illustrates an exemplary method capable of streaming data from a host system 100 to a visualizer 102. This embodiment entails two modules, a host and a visualizer. It is expressly contemplated that some or all of the processes, steps, or procedures can be carried out by an interconnected (wired or wireless) computing device/processor, such as a purpose-built processor or a general purpose computer (e.g. server, PC, laptop, smartphone, tablet, headset etc.), with a user interface and one or more displays. The host and visualizer modules may be implemented as electronic hardware, software consisting of a non-transitory computer-readable medium of program instructions, or a combination of hardware and software. The host and visualizer modules may optionally be deployed on the same computing device or on different computing devices across a network. In this embodiment, the host module invokes 21 visualizer module and passes one or more multidimensional data record(s) and instructions regarding which prior data record(s), if any, said multidimensional data record(s) are connected to. In turn, the visualizer module 22 generates 2D shape(s) or 3D object(s) with visual features representing variables in said data record(s). The visualizer module then renders 23 said 2D shape(s) or 3D object(s) optionally connected to prior shape(s) or object(s) already displayed. The host module continues calling visualizer in this manner 25 for as long as the user wishes streaming data to be visualized in this manner 24.

Figure 3:
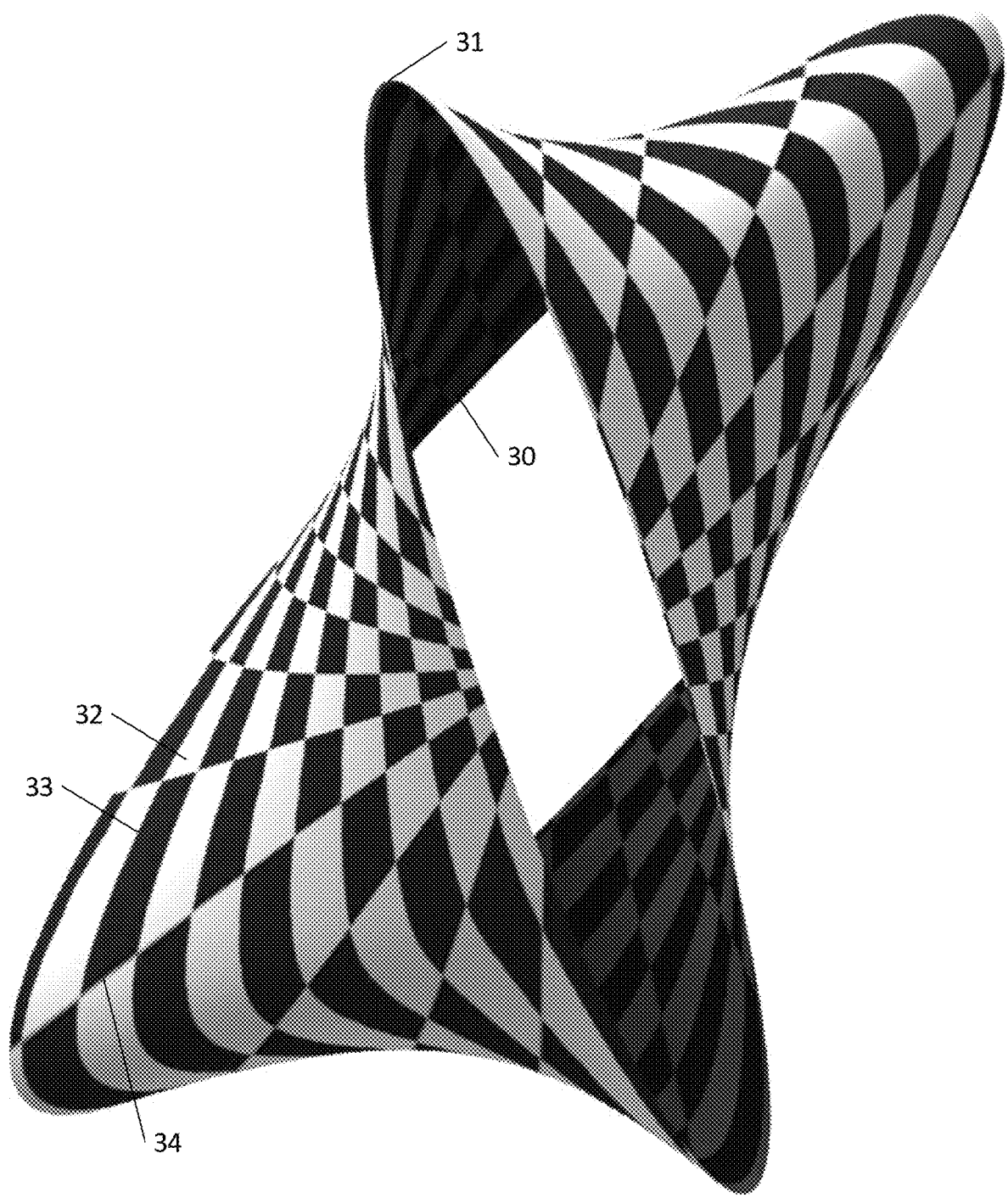
FIG. 3 illustrates an embodiment with two 2D ovals rendered in 3D space, each representing an individual 6-dimensional data record.

FIG. 3 is a rendering of an example illustrating two 2D ovals 30 and 31 rendered in 3D space, each representing an individual multidimensional data record. In this embodiment, X and Y position of each oval's center, height and width of oval, rotational angle of each oval, and distance to next oval in sequence offer 6 dimensions. In this embodiment, a polygon mesh connects the two ovals. In this embodiment, the polygon mesh has a checkerboard 32 rendered wherein X 34 and Y 33 spacing of said checkerboard may optionally represent an additional two data dimensions for the preceding oval's data record. This example demonstrates that surface texture can be used to render more than one data dimension, this feature can optionally be applied to any of the other examples of the present disclosure.

Figure 4:
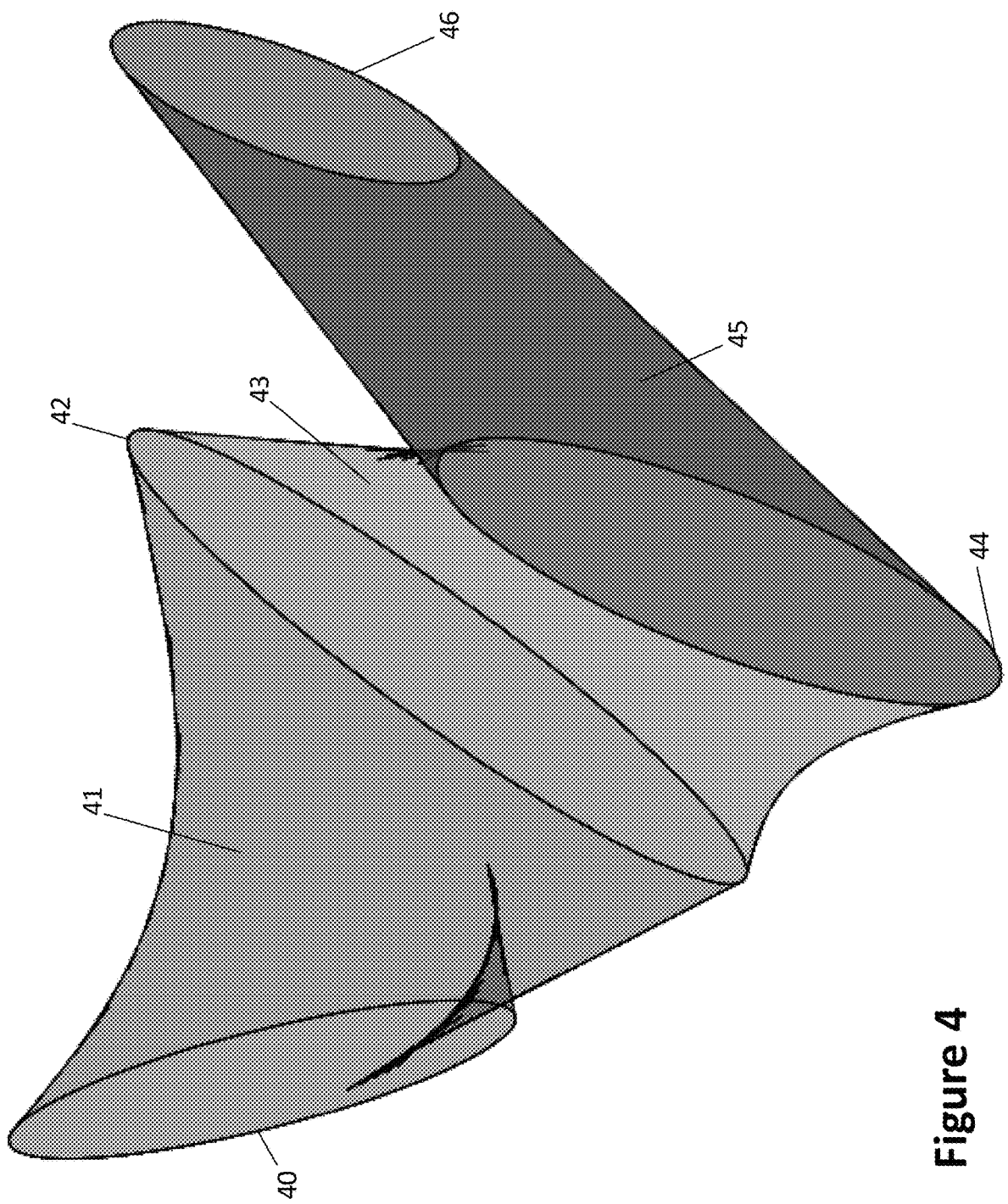
FIG. 4 illustrates an embodiment with a plurality of 2D ovals in a 3D space for visualizing a 10-dimensional floating point dataset.

FIG. 4 is a schematic diagram illustrating one embodiment offering a plurality of 2D ovals 40, 42, 44 and 46 in a 3D space. In this embodiment, each oval represents a multidimensional data record where the oval's height, width, rotational angle, Y and Z-axis orientational angles, Y and Z-axis center position, distance from previous oval in sequence, color and translucence represent 10 data dimensions of a given dataset. FIG. 4 is rendered in color to demonstrate the optional use of color as a feature for representing one of the many data dimensions for data records represented by all but the final oval.

Figure 5:
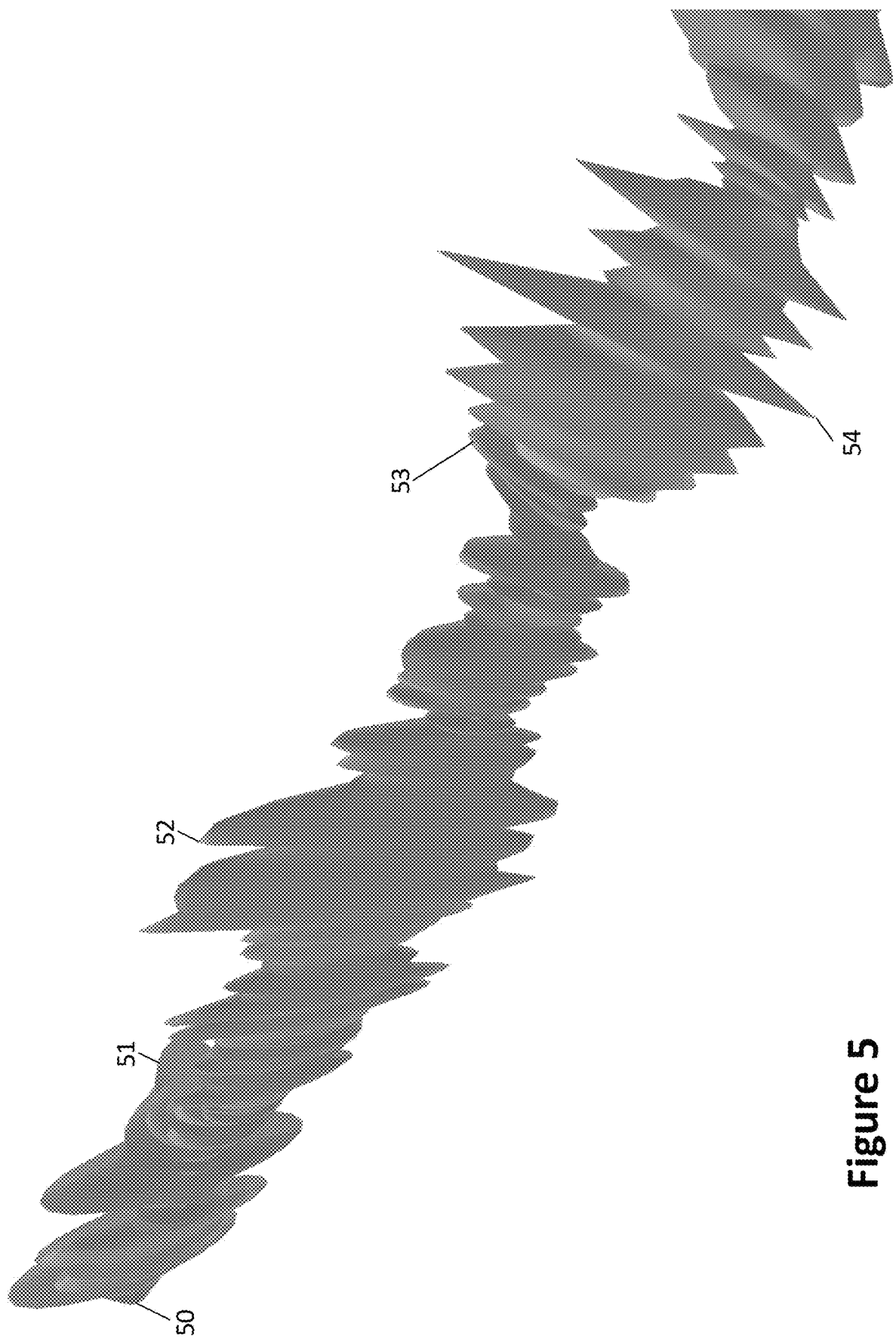
FIG. 5 illustrates an embodiment with a plurality of 2D ovals in a 3D space for visualizing a 7-dimensional floating point dataset.

FIG. 5 is a rendering from one embodiment wherein 2D ovals are generated in sequence streaming along the X-axis in 3D space to visualize a 7-dimensional dataset wherein each data record value is rendered as separate feature for each oval. Said features in this embodiment include y and z position of the oval's center, height and depth of the oval, color and translucence of the polygon mesh surface connecting the oval with previous in sequence and distance from prior to this ovals' center. In this embodiment, oval 53, as depicted, demonstrates oval center position used as one of several data variables whereas oval 52 demonstrates oval height as one of several data variables.

Figure 6:
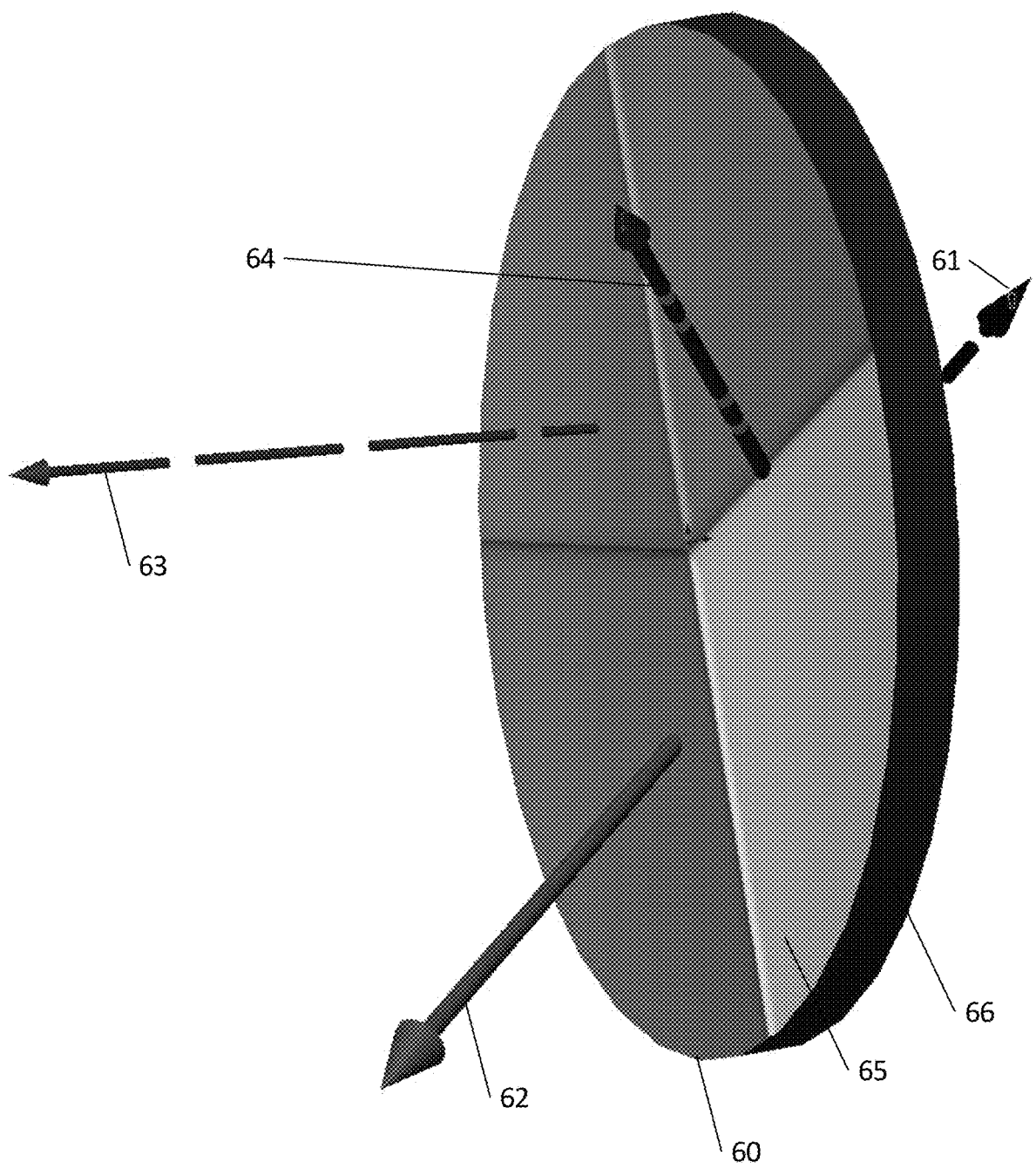
FIG. 6 illustrates a 3D disc object with affixed vector arrows.

FIG. 6 illustrates a 3D disc object 60 with affixed vector arrows 61, 62, 63 and 64. A plurality of said 3D disc objects with a plurality of affixed vector arrow(s) in 3D space, optionally connected or not, comprises another embodiment. In this embodiment, features for rendering each data record include x, y and z position of the disc's center, x, y and z-axis angle of the disc, thickness, length and width of the disc, speed of vibratory motion in 3D space animated over time, border color 66, translucence and a conventional pie chart 65 rendered onto the disc's surface, representing at least 12 dimensions plus a pie chart. Additionally, each disc may have one or more vectors originating from anywhere on the disc's surface with x- and y-axis angle and length in relation to said disc's surface, plus thickness, color and line style of vector to represent at least 7 additional dimensions per vector.

Figure 7:
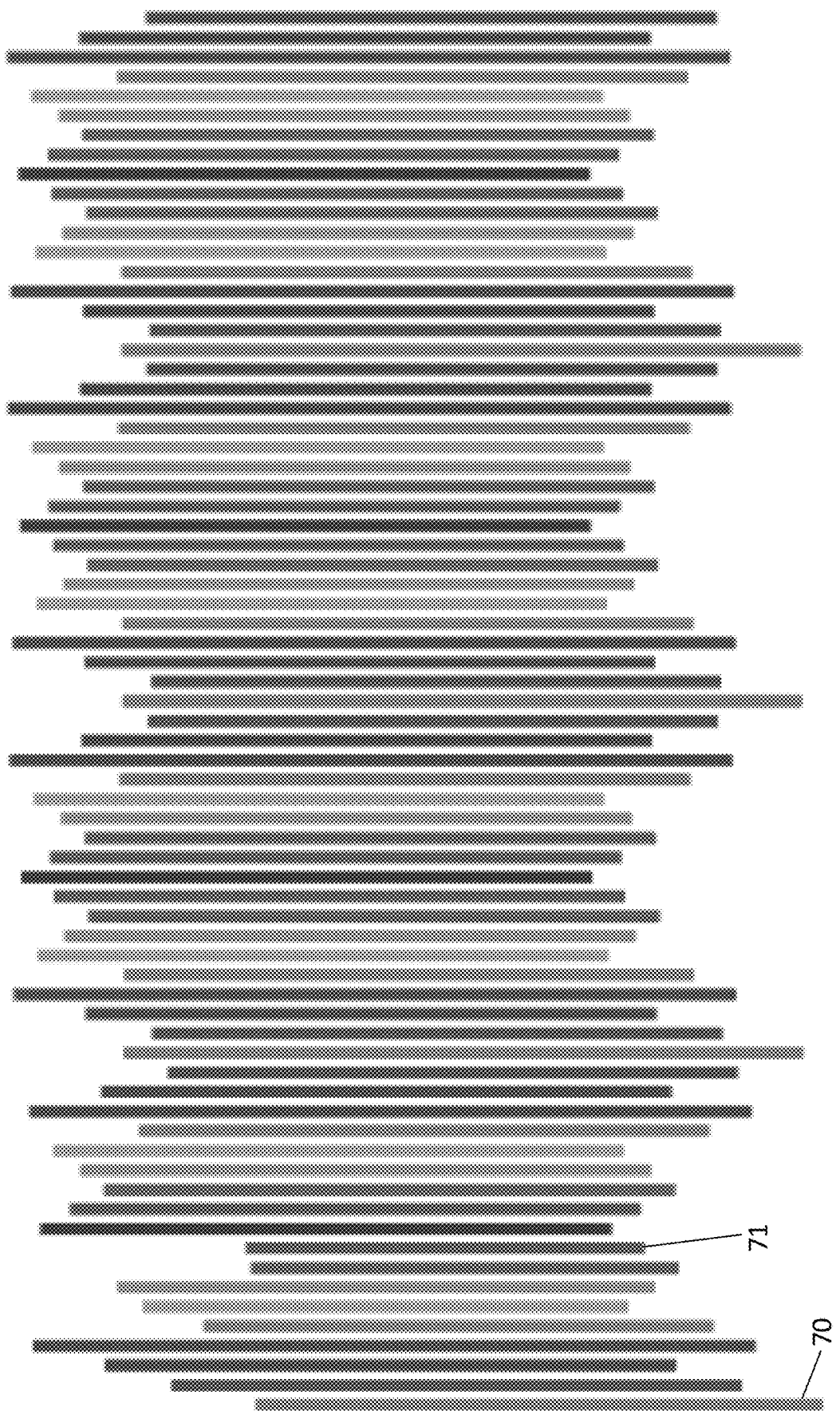
FIG. 7 illustrates one embodiment offering a plurality of 2D shapes on a 2D surface.

FIG. 7 is a schematic diagram illustrating one embodiment offering a plurality of optionally similar or dissimilar 2D shapes (for example as depicted, vertical bars 70) on a 2D surface. In the depicted embodiment, each 2D shape represents an individual multidimensional data record where Y-axis position, height and color of the bar are used to represent three separate values for each data record in the series. Additional features could be added to this embodiment to represent more variables per bar, including variable bar width, spacing between bars, fill pattern or texture, translucence, bar angle, and using 2D shapes other than bars. This diagram is rendered in color to demonstrate the optional use of color as a feature for representing one of the many data dimensions.

Figure 8:
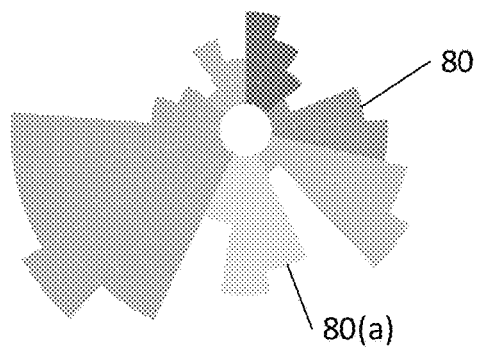
FIG. 8 illustrates example 2D shapes which could be used for representing individual data records in place of ovals as depicted in other figures.
Figure 8:
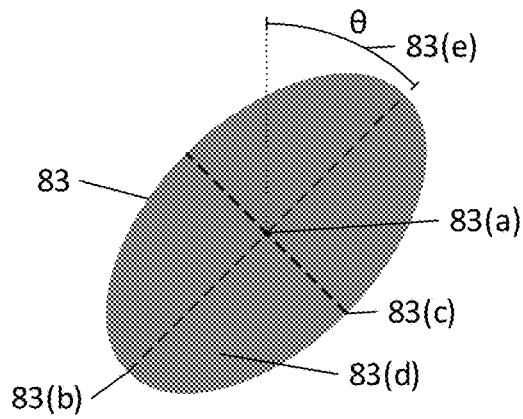
Figure 8:
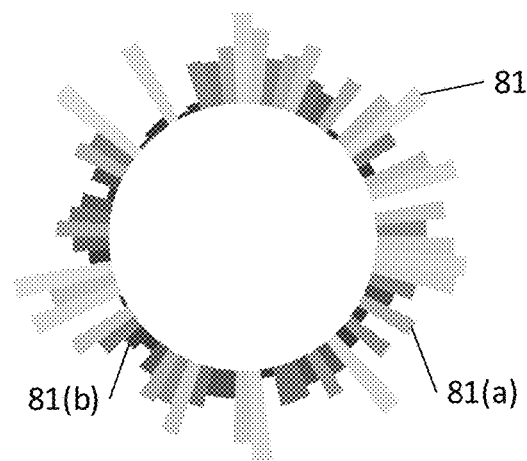
Figure 8:
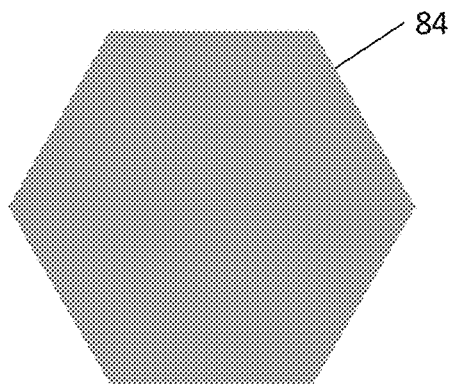
Figure 8:
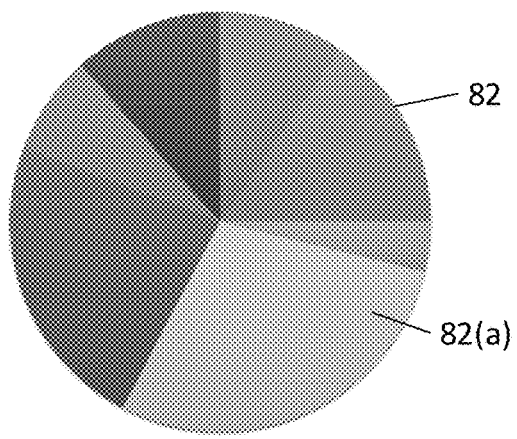
Figure 8:
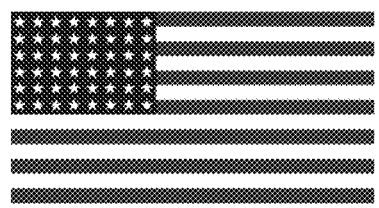

FIG. 8 illustrates example 2D shapes which could be used for representing individual data records. FIG. 8.4 is an oval 83; some embodiments discussed earlier render dimensions of a data record using features including the oval's center location 83(*a*), length 83(*b*), width 83(*c*), color 83(*d*) and rotational angle 83(*e*).

Figure 9:
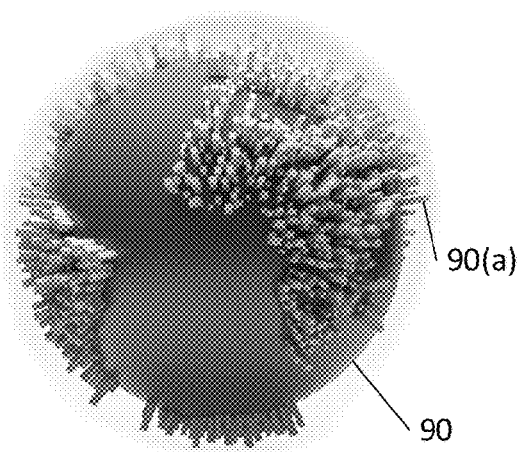
FIG. 9 illustrates example 3D shapes which could be used for representing individual data records in place of ovals as depicted in other figures.
Figure 9:
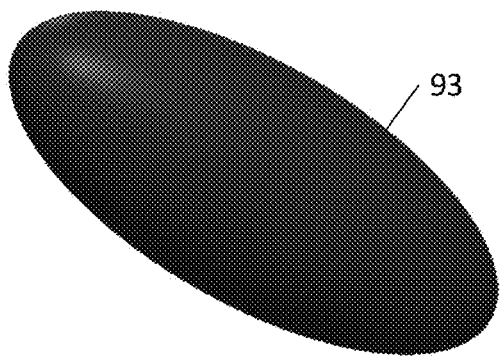
Figure 9:
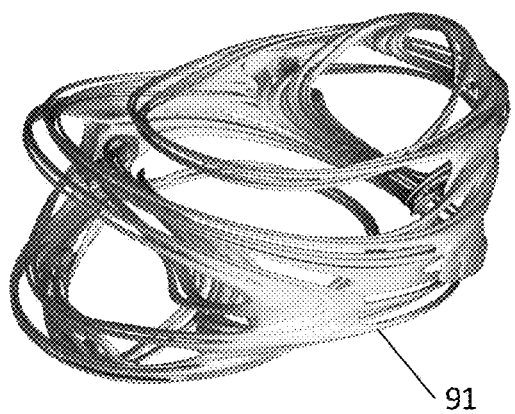
Figure 9:
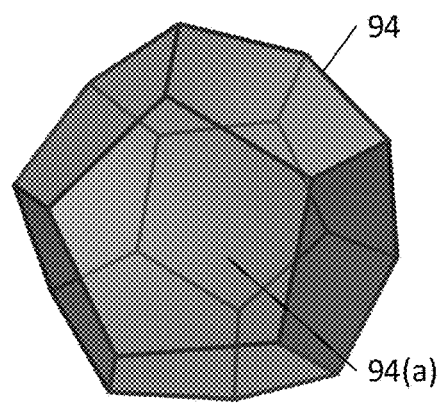
Figure 9:
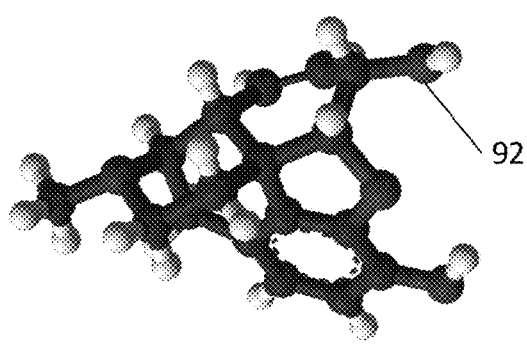

In place of ovals as depicted in embodiments illustrated in FIGS. 3, 4 and 5, other embodiments comprise other 2D and 3D shapes such as those depicted in FIGS. 8 and 9 and/or other sensory properties used to represent data dimensions. For example, FIG. 8.1 is a circumplex 80; one embodiment would chain a plurality of said circumplex each with bars 80(*a*) representing a given data record's dimensions. FIG. 8.2 is a radial histogram 81; one embodiment would chain a plurality of said radial histograms each with bars such as 81(*a*) representing a given data record's dimensions. For embodiments using either the circumplex 80 or radial histogram 81, the length and color of N sections may be used to represent 2N data dimensions. Additional dimensions can again be introduced for FIGS. 8.1 and 8.2 using length, width, position, rotational angle and other properties as discussed for ovals.

Embodiments using a pie chart 82 as depicted in FIG. 8.3 may use color and size of pies to represent dimensions of a data record. FIG. 8.5 is an N-sided geometric shape 84 wherein the number and color of sides, in one embodiment, could represent an additional data dimensions, and FIG. 8.6 is a photo or image.

FIG. 9 illustrates example 3D objects which could be used for representing individual data records in place of ovals as illustrated in other embodiments. FIG. 9.1 depicts a 3D object containing data bars 90(*a*) emanating from a 3D depiction of a planet 90; one embodiment would connect a network of said 3D objects in 3D space using means such as lines or splines. FIG. 9.2 depicts a 3D Fractal 91; one embodiment may render multiple such fractals illustrating various features of data in a sequence or network configuration. FIG. 9.3 depicts a 3D rendering of a molecule 92. FIG. 9.4 depicts an ellipsoid 93; one embodiment may use properties of said ellipsoid to represent various data dimensions. FIG. 9.5 depicts a polyhedron 94; one embodiment may use properties 94(*a*) of said polyhedra to represent various data dimensions.

Figure 10:
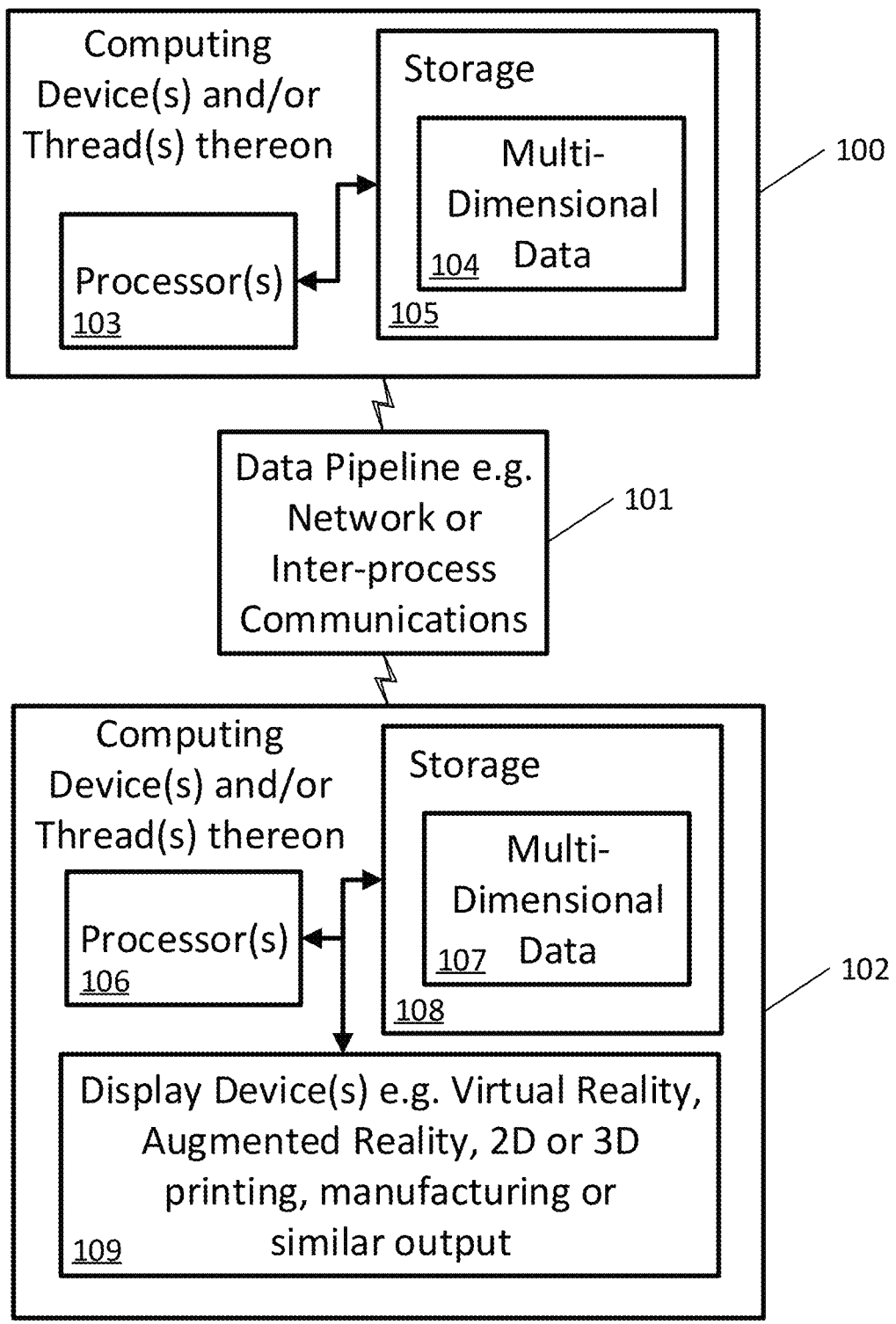
FIG. 10 is a schematic block diagram which illustrates several system embodiment permutations which perform the methods illustrated in FIGS. 1 and 2.

FIG. 10 is a schematic block diagram which illustrates an example system to implement any of the visualizations of the present disclosure.

One or more computing device(s) and/or thread(s) thereon 100 include non-transitory medium with computer executable instructions stored thereon executed by one or more processor(s) 103 to perform the method such as the embodiment illustrated in FIGS. 1 and 2.

Some system embodiments comprise one or more computing device(s) and/or thread(s) thereon 100 which pass multi-dimensional data 104 via a data pipeline 101 to one or more other computing device(s) and/or thread(s) thereon 102 which render the multi-dimensional experience for the user by way of Display Device(s) (e.g. visualizer 12 or 102), such as a Virtual Reality (VR) device such as Oculus Rift manufactured by Oculus VR, HTC Vive manufactured by HTC, or Google Cardboard manufactured by Google, Augmented Reality (AR) device such as Google Glass manufactured by Google or HoloLens manufactured by Microsoft, holographic display device such as a laser plasma, micromagnetic piston display, holographic television display, or touchable hologram, 2D or 3D printing, manufacturing or similar output 109. In either VR or AR scenarios, a user may don the AR or VR headset to experience the above visualizations. In still other examples, the visualizations may be physically printed using a 2D or 3D printer, allowing for a physical implementation of the visualization. In still other examples, an audio device (such as headphones, ear buds, either onboard the visualizer or separate therefrom, etc.) can be donned by the user to receive auditory data that corresponds to the visual data.

In some embodiments, the data pipeline 101 might be implemented such that multidimensional data 104 is communicated statically or streamed in real-time across a computer network into one or more computing device(s) 102 which render using the multidimensional data visualizer. In other embodiments, the data pipeline 101 may optionally be implemented locally within the same computing device that hosts both the multidimensional data 104 and the multidimensional data visualizer 102.

Other embodiments are self-contained wherein a single computing device performs all computer executable instructions to access, processes and render said multi-dimensional experience for the user.

Figure 11:
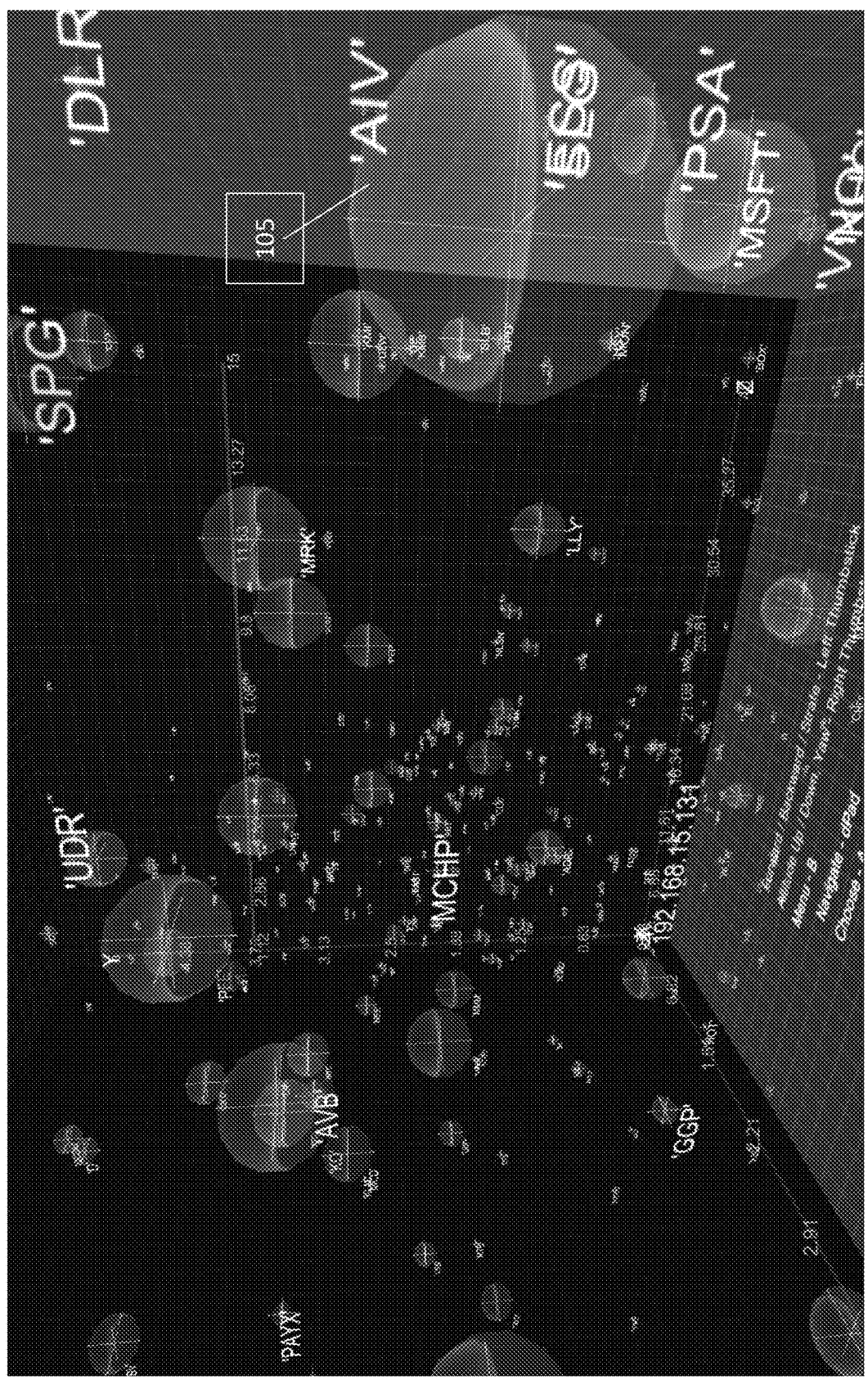
FIG. 11 is a rendering from one embodiment wherein multiple ellipsoids are rendered into 3D space, each representing a multivariate data record.

FIG. 11 is a rendering from one embodiment wherein multiple ellipsoids 105, 93 are rendered into 3D space, each representing a multivariate data record. In one embodiment, the multivariate universe of discrete records may be animated over another variable such as time. When records are animated, an optional trail of various features may appear behind movement of each for the purpose of seeing recent trends.

One example is the use of multiple visual (and optionally, auditory) features of the immersive experience in virtual, mixed or augmented reality about each object in space for perceiving multiple independent variables about financial instruments such as stocks and commodities. As an illustrative example, optionally, each stock's:

Sales Growth over the past 5 yrs by X Position
Price/Earnings Ratio may be represented by Z Position of the ellipsoid's center,
Dividend Yield by Y Position,
Market capitalization by ellipsoid size (i.e. conveying how "big" a company is in the markets),
Price to Free Cash Flow, by Color (e.g. blue through red),
Price/Book ratio by opacity (conveying how "solid" a company looks), Debt/Equity Ratio by clouds orbiting said ellipsoid (e.g. more cloudy representing more debt), Revenue per Employee represented by color of said clouds (e.g. dark clouds when revenue per employee is relatively low, light when it is high)

Volume of shares traded by amount of sparks emanating from said ellipsoid (and perhaps using visual features of said sparks to represent discrete variables about each trade, exchange or other discrete constituents), % institutional ownership by color of said sparks, Price to Sales Ratio by Oscillation movements (e.g. faster for potential bargain stocks with low Price to Sales ratios), Sector of Economy by Texture (of fixed set of textures), Company's rank within sector by Depth of Texture (i.e. bumpier texture=stronger rank), Analyst Recommendation (angle about Z-axis; opinions over time like motion blowing in the wind), Insider Ownership by glow (more glowing halo about companies more held by insiders), Time since stock's IPO Date by Spatial Audio Pitch (e.g. higher pitch=more recent IPO), and Stock tickers labeled with text.

Optionally, one or more external system(s) 100, program thread(s) or other source of multidimensional data 10 may feed via a data pipeline 11, 101 whereby said rendering is updated over time.

Optionally, the user from within virtual (VR), mixed or augmented reality (AR) may signal the multidimensional data visualizer 12, optionally via gestural or other conventional user interface interaction, resulting in sending event, invoking callback or other such means to affect said external system(s) 100, program thread(s) or other source of multidimensional data 10 whereby the latter may alter data streamed, iterated or otherwise transmitted into the multidimensional data visualizer. In this regard, the user may interact with the dataset and modify the visualization by providing gestural or other input recognized by the visualizer 12, 102 via the AR/VR device. In turn, the visualizer 12, 102 may send instructions and/or data back to the host 10, 100 via means such as an event, invoking callback or other such means to affect said host system 10, 100, program thread(s) or other source of multidimensional data 10. As a result of this, program instructions running on said host system 10, 100 to process such messages from visualizer 12, 102 may alter data or code which produces said data. In turn, host system 10, 100 may again transmit instructions and/or data which alter data rendering on said visualizer.

Figure 15:
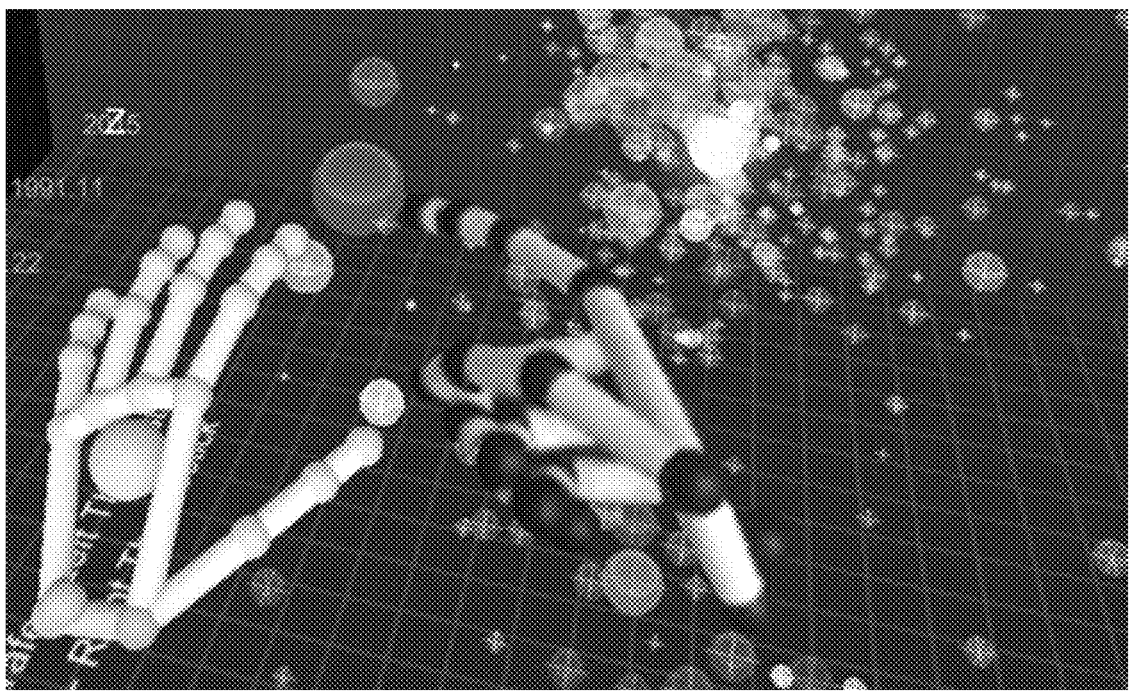
FIG. 15 illustrates user interaction within a virtual, mixed or augmented reality environment.

One example permits a human operator to interact with said visualization in the AR/VR device by pushing on the data, moving data point(s), moving control slider(s) or turning their hand(s), processed by visualizer 12, 102, as shown in FIG. 15. This may result in visualizer 12, 102 sending instructions and/or data about said gestural action back to code running on the host 10, 100. In some embodiments, said code running on the host 10, 100 may be code written by said human operator. In turn, code on host 10, 100 has implemented a means of receiving said instructions and/or data about said gestural action, which may processes said instructions and/or data according to said human operator's specifications. An example of this in practice is for interacting with machine learning models, where the human operator's gestural processing code may alter model parameters and/or constraints, re-run or update their model then update visualizer 12, 102 with appropriate new data. As a result of this interaction, said human operator gains an experience of interacting with multivariate outputs of their code such as statistical or numerical models or machine learning algorithms. Another example, using a conventional gaze reticule said human operator may gaze upon a data record as rendered in visualizer 12, 102 and indicate they wish to learn more about said multivariate data record. In turn, visualizer 12, 102 may display within VR/AR for said human operator all variables, values and/or metadata about said multivariate data record for said human operator.

Another example, said human operator may reach out with their hands and rotate an entire plot to more easily see it from a different angle.

Figure 12:
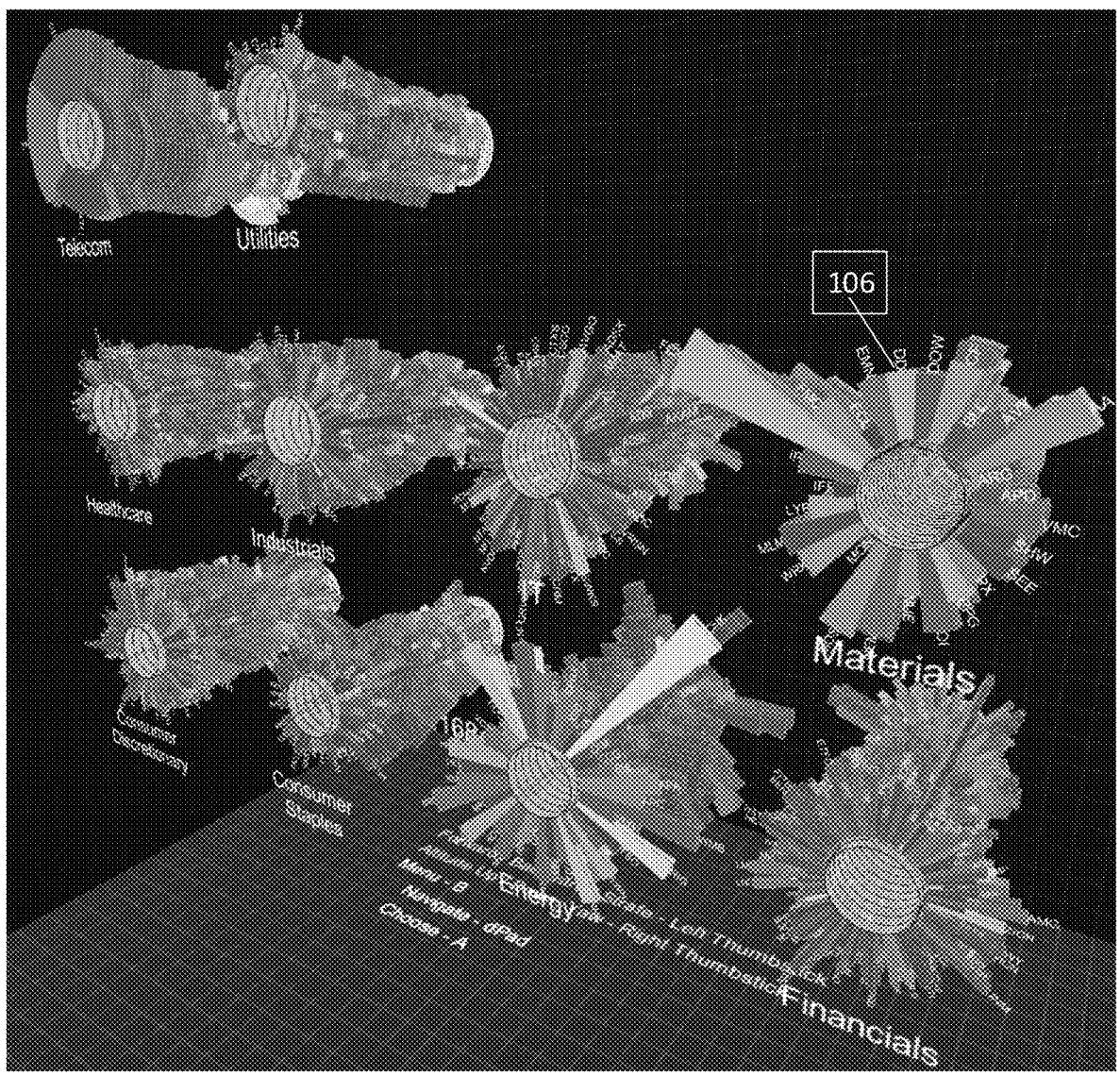
FIG. 12 is a rendering from one embodiment wherein extruded 3D radial histograms are generated in sequence, optionally for representing multiple independent timeseries data.

FIG. 12 is a rendering from one embodiment wherein extruded 3D radial histograms such as 106 are generated in sequence, optionally for representing multiple independent timeseries data.

In one embodiment, this may be used for rendering the multivariate universe of timeseries data including but not limited to that contained within conventional stock charts such as closing price and volume traded, and doing so for many financial instruments at a time, optionally organized across several such renderings in groupings meaningful to the user such as by sector of the economy as depicted in FIG. 12.

Optionally, each bar of said radial histogram(s) may represent a particular stock at a particular point in time. As an illustrative example, optionally, visual and/or auditory features within virtual, mixed or augmented reality for displaying some or all bar(s) of said radial histogram(s) may include Closing price (or normalization thereof) may be represented by height of said bar, Volume traded may be represented by the volume of sparks emanating from said bar (e.g. ranging from dull yellow for lower volumes traded through bright red for larger volumes traded), Price/Book Ratio by opacity (e.g. conveying how "solid" a company looks at that point in time), Price/Earnings (P/E) Ratio by glowing effect emanating from said bar (e.g. more intensely glowing "halo" about bars where P/E Ratio suggests a bargain)

Social media sentiment about the stock by weather such as clouds, lightning and precipitation animated about said bar (each representing different sentiment, as derived using e.g. conventional text sentiment algorithms), Key news events represented by iconography about said bar (where choice of iconography may optionally represent metrics derived by standard Natural Language Processing and/or the user may optionally gaze upon said iconography to read said news), Depth of market order book as gradient of color along said bar (e.g. emanating from center along length of said bar, with yellow representing low order prices through red with higher order prices at said bar's point in time)

Optionally, one or more external system(s) 100, program thread(s) or other source of multidimensional data 10 may feed via a data pipeline 11, 101 whereby said rendering is updated over time.

Optionally, the user from within virtual, mixed or augmented reality may signal the multidimensional data visualizer 12, optionally via gestural or other conventional user interface interaction, resulting in sending event, invoking callback or other such means to affect said external system(s) 100, program thread(s) or other source of multidimensional data 10 whereby the latter may alter data streamed, iterated or otherwise transmitted into the multidimensional data visualizer.

Figure 13:
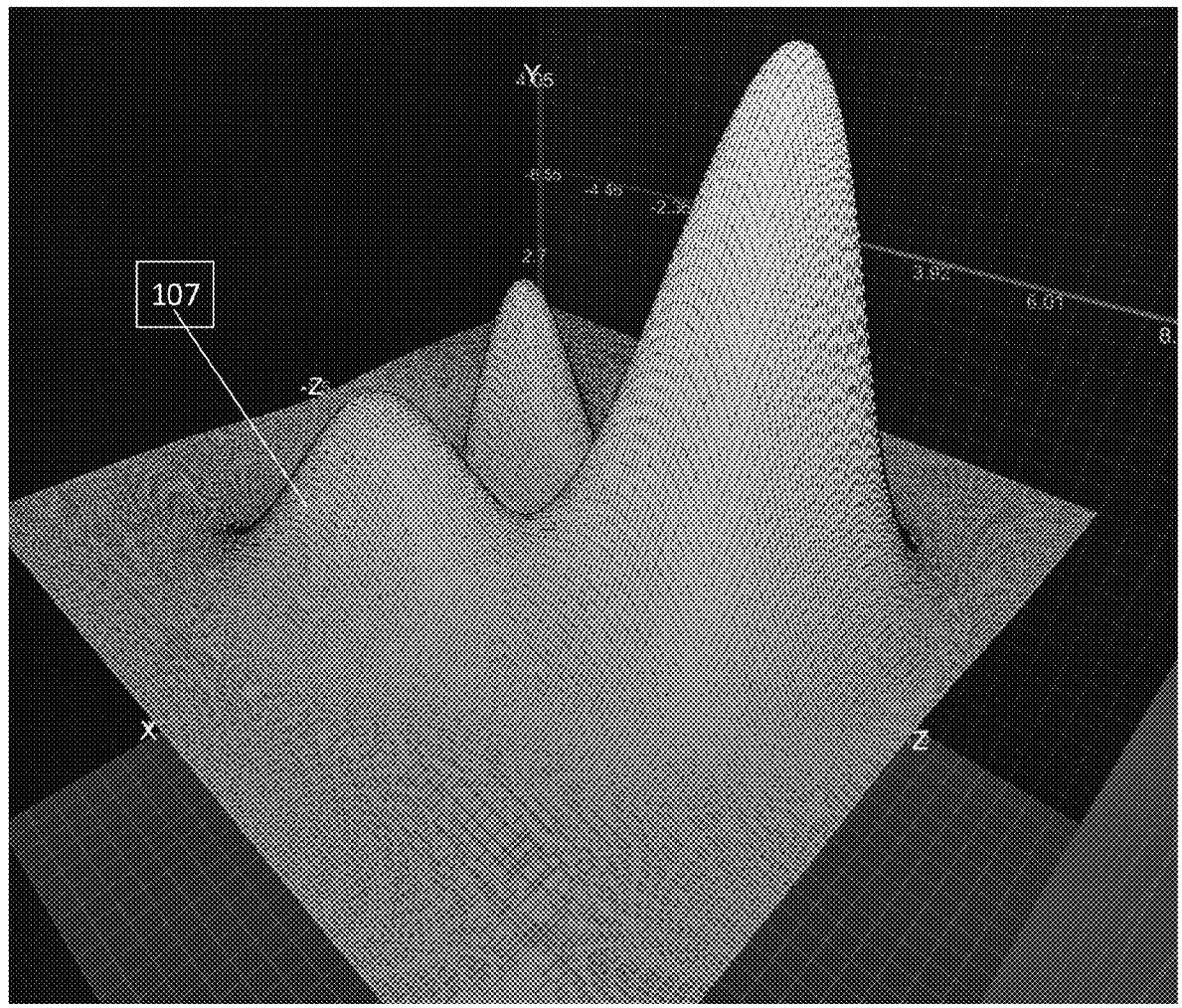
FIG. 13 is a rendering from one embodiment wherein multivariate data is rendered onto a 3D surface plot using multiple visual (and optionally, auditory) features of the immersive experience in virtual, mixed or augmented reality.

FIG. 13 is a rendering from one embodiment wherein multivariate data is rendered onto a 3D surface plot 107 using multiple visual (and optionally, auditory) features of the immersive experience in virtual, mixed or augmented reality. Optionally, visual and auditory features for representing multivariate data at each point X, Y, Z (or optionally, region about said point) upon said 3D surface may optionally include (but not be limited to):

Color,
Opacity,
Glowing or other particle effects emanating from surface at said point/region
Surface texture, and optionally bumpiness thereof,
Vibratory effect, and optionally, extent thereof,
Spatial audio, optionally including pitch and time between tone(s),
X, Y and Z angles, length, line thickness and/or color of an arrow emanating from said surface, Optionally, one or more external system(s) 100, program thread(s) or other source of multidimensional data 10 may feed via a data pipeline 11, 101 whereby said rendering is updated over time.

Optionally, the user from within virtual, mixed or augmented reality may signal the multidimensional data visualizer 12, optionally via gestural or other conventional user interface interaction, resulting in sending event, invoking callback or other such means to affect said external system(s) 100, program thread(s) or other source of multidimensional data 10 whereby the latter may alter data streamed, iterated or otherwise transmitted into the multidimensional data visualizer.

Figure 14:
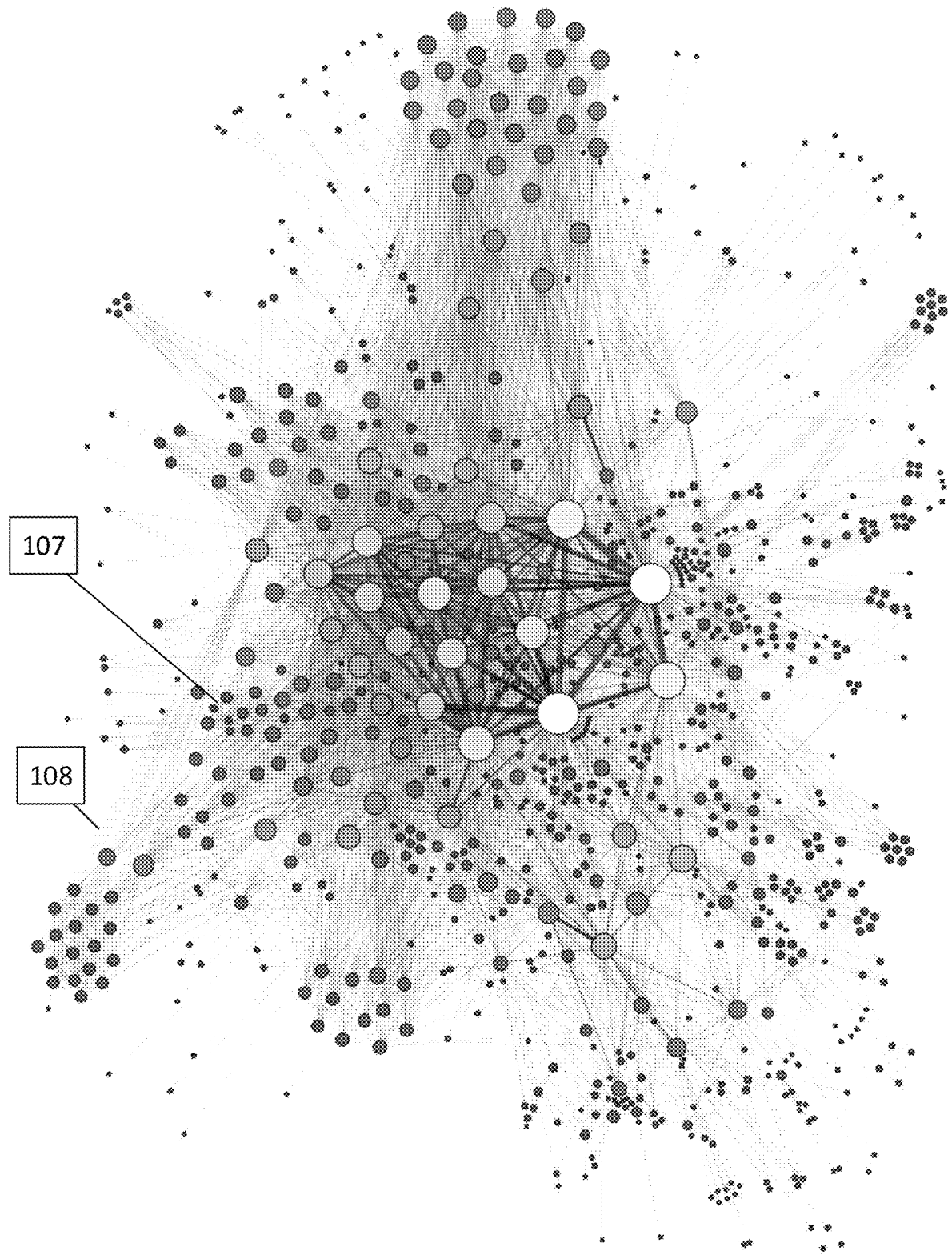
FIG. 14 is a conventional rendering of a network of nodes with connections.

FIG. 14 is a conventional rendering of a network of nodes 107 with connections 108. One embodiment which expands on this would render multivariate records as nodes and/or multivariate records as connections using said feature(s) for each variable. An example would be connections for which multiple variables are rendered by independently varying e.g.

Color,
Opacity,
2D cross-section shape,
2D cross-section size,
Particle effects emitting e.g. sparks of varying color and/or distances, fog or other visual effects,
Water or other animations moving along surface of said connection (and optionally, color and/or speed thereof),
Movement (animation) over time,
Smaller objects orbiting about said connection,
Spatial audio emitting from said connection, with varying pitch/tone, oscillation thereof, volume, duration of tone vs. silence and/or other audio properties,
Surface smoothness,
Specular reflectivity and/or other lighting properties,
Surface texture choice and, optionally, bumpiness thereof, and/or
Any other features, including those mentioned elsewhere.

Optionally, one or more external system(s) 100, program thread(s) or other source of multidimensional data 10 may feed via a data pipeline 11, 101 whereby said rendering is updated over time.

Optionally, the user from within virtual, mixed or augmented reality may signal the multidimensional data visualizer 12, optionally via gestural or other conventional user interface interaction, resulting in sending event, invoking callback or other such means to affect said external system(s) 100, program thread(s) or other source of multidimensional data 10 whereby the latter may alter data streamed, iterated or otherwise transmitted into the multidimensional data visualizer.

Features of the virtual reality, mixed reality or augmented reality experience are referred to throughout the document. These refer to any aspect of experience, visual and/or special effects, auditory or otherwise, which can be useful for representing a data value. This section elaborates examples of several such features which may optionally be included in some embodiments:

diameter: an imaginary line passing from side to side through the center of a body or figure, especially a circle or sphere, representing its size.

length: the measurement or extent of something from end to end; the greater of two or the greatest of three dimensions of a body.

width: the measurement or extent of something from side to side.

depth: the distance from the top or surface of something to its bottom.

thickness: the distance between opposite sides of something.

cross-section shape: a cross section is the shape we get when cutting straight through an object.

color: the property possessed by an object of producing different sensations on the eye as a result of the way the object reflects or emits light.

position: X, Y and Z location in 3D space.

edge: the outside limit of an object, area, or surface; a place or part farthest away from the center of something.

movement: an act of changing physical location, position or of having this or other properties change over the course of time.

trails denoting movement: a mark or a series of signs or objects left behind by the passage of someone or something.

texture: the feel, appearance, or consistency of a surface or a substance. This may also be an image such as a flag, iconography or photograph.

texture bumpiness: how deep a given texture is rendered to appear.

spatial audio: Audio amplification and speaker technologies that reproduce the spaciousness of sound in either a real venue such as a live concert or in a fabricated environment created by digital signal processing (see DSP). Various techniques are used to simulate both effects.

translucence: permitting light to pass through, perhaps diffusing it so that objects, etc., on the opposite side are visible to varying degrees.

shadow: a dark area or shape produced by a body coming between rays of light and a surface.

reflectivity: the measure of the proportion of light or other radiation striking a surface that is reflected off it.

lighting properties: other independent aspects of the visual experience related to lighting effects which may be used to represent independent variables.

illumination emanating from within: the intensity of light emitted.

glowing effect about and/or color thereof: e.g. luminescent outline of varying color and intensity, which does not occlude object itself.

metallicity: how "metal-like" a surface appears. When a surface is more metallic, it reflects the environment more and its albedo colour becomes less visible. At full metallic level, the surface colour is entirely driven by reflections from the environment. When a surface is less metallic, its albedo colour is more clear and any surface reflections are visible on top of the surface colour, rather than obscuring it.

surface smoothness: controls the microsurface detail across a surface, which may range from a plaster-type appearance through glossy and mirror finish.

specular: varies surface appearance from a rubber-like finish through plastic and brushed or mirrored metallic finish.

rotational angle: the action of rotating around an axis or center, independently about the X, Y and Z axes.

movement such as oscillation (movement back and forth), and speed thereof particle effects: A particle system is a technique in game physics, motion graphics, and computer graphics that uses a large number of very small sprites, 3D models, or other graphic objects to simulate certain kinds of "fuzzy" phenomena, which are otherwise very hard to reproduce with conventional rendering techniques—usually highly chaotic systems, natural phenomena, or processes caused by chemical reactions. Examples of such phenomena which are commonly replicated using particle systems include fire, explosions, smoke, moving water (such as a waterfall), sparks, falling leaves, rock falls, clouds, fog, snow, dust, meteor tails, stars and galaxies, or abstract visual effects like glowing trails, magic spells, etc.—these use particles that fade out quickly and are then re-emitted from the effect's source. Another technique can be used for things that contain many strands—such as fur, hair, and grass—involving rendering an entire particle's lifetime at once, which can then be drawn and manipulated as a single strand of the material in question. Particle effects may be two-dimensional or three-dimensional.

animated effects such as weather and orbit of smaller objects special effects: illusions or visual tricks used in the film, television, theatre, video game, and simulator industries to simulate the imagined events in a story or virtual world.

visual effects: the processes by which imagery is created and/or manipulated outside the context of a live action shot.

shader effects: In the field of computer graphics, a shader is a computer program that is used to do shading: the production of appropriate levels of color within an image, or, in the modern era, also to produce special effects or do video post-processing. A definition in layperson's terms might be given as "a program that tells a computer how to draw something in a specific and unique way."

two dimensions of angle along an optional polygon mesh, line or spline which may optionally connect this with adjoining 2D shape(s) or 3D object(s), and/or other features of said 2D shape or 3D object or its connection with adjoining 2D shape(s) or 3D object(s) in 3D space iconography: a person or thing regarded as a representative 2D or 3D symbol of something, which may or may not be animated.

label text: a sequence of printed characters.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, also as used herein, various directional and orientational terms (and grammatical variations thereof) such as "vertical", "horizontal", "up", "down", "bottom", "top", "side", "front", "rear", "left", "right", "forward", "rearward", and the like, are used only as relative conventions and not as absolute orientations with respect to a fixed coordinate system, such as the acting direction of gravity. Additionally, where the term "substantially" or "approximately" is employed with respect to a given measurement, value or characteristic, it refers to a quantity that is within a normal operating range to achieve desired results, but that includes some variability due to inherent inaccuracy and error within the allowed tolerances (e.g. 1-2%) of the system. Note also, as used herein the terms "process" and/or "processor" should be taken broadly to include a variety of electronic hardware and/or software based functions and components. Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor here herein can be implemented using electronic hardware, software consisting of a non-transitory computer-readable medium of program instructions, or a combination of hardware and software. Accordingly, this description is meant to be taken only by way of example, and not to otherwise limit the scope of this invention.

What is claimed is:

1. A computer-implemented method for interactively and simultaneously displaying multiple dimensions of static or real-time streaming multivariate data, the method comprising:

generating at least one 2D shape or 3D object to represent at least one multivariate data record of the multivariate data;

generating one or more features associated with the at least one 2D shape or 3D object, an intensity of the one or more features representing a data value of one or more respective dimensions of the multivariate data record, wherein lower data values are rendered as less intense features about at least one 2D shape or 3D object whereas higher data values are rendered as more intense features about at least one 2D shape or 3D object, which together represent at least a subset of dimensions of each of the at least one multivariate data record, wherein said features include at least two or more of: an intensity of specular effects based upon a value of at least one dimension of the multivariate data record, an intensity or magnitude of shader effects based upon a value of at least one dimension of the multivariate data record, fractal effects based upon a value of at least one dimension of the multivariate data record, degree of bumpiness of a texture of the at least one 2D shape or 3D object based upon a value of at least one dimension of the multivariate data record, relative intensity of darkness and/or length of one or more shadows of the at least one 2D shape or 3D object based upon a value of at least one dimension of the multivariate data record, relative intensity of reflectivity of the at least one 2D shape or 3D object based upon a value of at least one dimension of the multivariate data record, relative intensity of illumination emanating from within the at least one 2D shape or 3D object based upon a value of at least one dimension of the multivariate data record, intensity of glowing effect about the at least one 2D shape or 3D object based upon a value of at least one dimension of the multivariate data record, intensity of metallicity appearance of the at least one 2D shape or 3D object based upon a value of at least one dimension of the multivariate data record, degree of surface smoothness of the at least one 2D shape or 3D object based upon a value of at least one dimension of the multivariate data record, intensity of particle effects based upon a value of at least one dimension of the multivariate data record, or intensity of animated effects where objects transform their geometry over time in a manner based upon a value of at least one dimension of the multivariate data record, rendering a plurality of said generated at least one 2D shape or 3D object; and displaying the multivariate data via at least one of a 2D display, virtual reality (VR) device, mixed reality device, augmented reality (AR) device, or holographic display device.

2. The method of claim 1, wherein at least some said 3D object(s) comprise a 3D extrusion of said 2D shape.

3. The method of claim 1, wherein rendering the plurality of said generated 2D shapes or 3D objects comprises rendering in sequence along a 3D spline or 3D line.

4. The method of claim 1, wherein the at least one 2D shape or 3D object comprises a plurality of 2D shapes or 3D objects that are connected visually in said 3D space simultaneously using a plurality of said features to represent multivariate relationship about each said connection.

5. The method of claim 1, further comprising:
in response to a gestural user input at least one of: current and/or new instances of said 2D shapes or 3D objects are modified, generated and/or visually appended to said plurality of 2D shapes or 3D objects in said 3D space.

6. The method of claim 1, wherein the at least one 2D shape or 3D object comprises at least one of a 3D fractal or a polyhedral.

7. The method of claim 1, wherein said features include at least three or more.

8. The method of claim 1, wherein the particle effects include one or more of: sparks; amount of sparks; color of sparks; varying distances of sparks; fire; clouds; fog; lightning; precipitation; explosions; smoke; falling leaves; rock falls; snow; dust; meteor trails; stars and galaxies; abstract visual effects; fur; hair; or grass.

9. The method of claim 8, wherein the abstract visual effects include one or more of: glowing trails; or magic spells.

10. The method of claim 1, wherein the animated effects include at least one of: weather; or orbits.

11. The method of claim 1, wherein the particle effects comprises at least one of particle count, speed, degree of chaos, magnitude, color, a speed and/or distance of vibratory motion over time, or opacity based upon a value of at least one dimension of the multivariate data record.

12. A non-transitory computer readable medium with computer executable instructions stored thereon executed by one or more processor(s) to perform the method of interactively and simultaneously displaying multiple dimensions of static or real-time streaming multivariate data, the method comprising:

generating at least one 2D shape or 3D object to represent each multivariate data record of the multivariate data;

generating one or more features associated with the at least one 2D shape or 3D object, an intensity of the one or more features representing a data value of one or more respective dimensions of the multivariate data record, wherein lower data values are rendered as less intense features about at least one 2D shape or 3D object whereas higher data values are rendered as more intense features about at least one 2D shape or 3D object, which together represent at least a subset of dimensions of each of the at least one multivariate data record, wherein said features include at least two or more of: an intensity of specular effects based upon a value of at least one dimension of the multivariate data record, an intensity or magnitude of shader effects based upon a value of at least one dimension of the multivariate data record, fractal effects based upon a value of at least one dimension of the multivariate data record, degree of bumpiness of a texture of the at least one 2D shape or 3D object based upon a value of at least one dimension of the multivariate data record, relative intensity of darkness and/or length of one or more shadows of the at least one 2D shape or 3D object based upon a value of at least one dimension of the multivariate data record, relative intensity of reflectivity of the at least one 2D shape or 3D object based upon a value of at least one dimension of the multivariate data record, relative intensity of illumination emanating from within the at least one 2D shape or 3D object based upon a value of at least one dimension of the multivariate data record, intensity of glowing effect about the at least one 2D shape or 3D object based upon a value of at least one dimension of the multivariate data record, intensity of metallicity appearance of the at least one 2D shape or 3D object based upon a value of at least one dimension of the multivariate data record, degree of surface smoothness of the at least one 2D shape or 3D object based upon a value of at least one dimension of the multivariate data record, intensity of particle effects based upon a value of at least one dimension of the multivariate data record, or intensity of animated effects where objects transform their geometry over time in a manner based upon a value of at least one dimension of the multivariate data record, rendering a plurality of said generated at least one 2D shape or 3D object; and displaying the multivariate data via at least one of a 2D display, virtual reality (VR) device, mixed reality device, augmented reality (AR) device, or holographic display device.

13. The non-transitory computer readable medium of claim 12, wherein at least some of said 3D object(s) comprises a 3D extrusion of said 2D shape(s).

14. The non-transitory computer readable medium of claim 12, wherein rendering the plurality of said generated 2D shapes or 3D objects comprises rendering in sequence along a 3D spline or 3D line.

15. The non-transitory computer readable medium of claim 12, wherein said 2D shapes or 3D objects are connected visually in said 3D space simultaneously using a plurality of said features to represent multivariate relationship about each said connection.

16. The non-transitory computer readable medium of claim 12, further comprising:
in response to a gestural user input at least one of: current and/or new instances of said 2D shapes or 3D objects are modified, generated and/or visually appended to said plurality of 2D shapes or 3D objects in said 3D space.

17. A computer-implemented method for interactively and simultaneously displaying multiple dimensions of static or real-time streaming multivariate data, the method comprising:

generating at least one 2D shape or 3D object to represent each multivariate data record of the multivariate data;

generating one or more features associated with the at least one 2D shape or 3D object, an intensity of the one or more features representing a data value of one or more respective dimensions of the multivariate data record, wherein lower data values are rendered as less intense features about at least one 2D shape or 3D object whereas higher data values are rendered as more intense features about at least one 2D shape or 3D object, which together represent at least a subset of dimensions of each of the at least one multivariate data record, wherein said features include at least two or more of: an intensity of specular effects based upon a value of at least one dimension of the multivariate data record, an intensity or magnitude of shader effects based upon a value of at least one dimension of the multivariate data record, fractal effects based upon a value of at least one dimension of the multivariate data record, degree of bumpiness of a texture of the at least one 2D shape or 3D object based upon a value of at least one dimension of the multivariate data record, relative intensity of darkness and/or length of one or more shadows of the at least one 2D shape or 3D object based upon a value of at least one dimension of the multivariate data record, relative intensity of reflectivity of the at least one 2D shape or 3D object based upon a value of at least one dimension of the multivariate data record, relative intensity of illumination emanating from within the at least one 2D shape or 3D object based upon a value of at least one dimension of the multivariate data record, intensity of glowing effect about the at least one 2D shape or 3D object based upon a value of at least one dimension of the multivariate data record, intensity of metallicity appearance of the at least one 2D shape or 3D object based upon a value of at least one dimension of the multivariate data record, degree of surface smoothness of the at least one 2D shape or 3D object based upon a value of at least one dimension of the multivariate data record, intensity of particle effects based upon a value of at least one dimension of the multivariate data record, or intensity of animated effects where objects transform their geometry over time in a manner based upon a value of at least one dimension of the multivariate data record;

rendering a plurality of said generated at least one 2D shapes or 3D objects, wherein said 2D shapes or 3D objects are connected by visual connections in said 3D space such that one or more of the plurality of said features applied to the visual connections represent a value of at least one dimension of the multivariate data record; and displaying the multivariate data via at least one of a 2D display, virtual reality (VR) device, mixed reality device, augmented reality (AR) device, or holographic display device.

18. The method of claim 17, wherein the 2D shapes or 3D objects comprise at least two nodes connected by the visual connections.

* * * * *